United States Patent
Bhagria et al.

[11] Patent Number: 5,892,953
[45] Date of Patent: Apr. 6, 1999

[54] CORRECTIVE SERVICE FACILITY

[75] Inventors: Ashok Kumar Bhagria, Boca Raton; Jose Antonio Tano, Boynton Beach; Duane Stephen Wood, Boca Raton, all of Fla.

[73] Assignee: International Business Machines Corporation, Armonk, N.Y.

[21] Appl. No.: 824,215

[22] Filed: Mar. 25, 1997

Related U.S. Application Data

[63] Continuation of Ser. No. 686,225, Apr. 15, 1991, abandoned.

[51] Int. Cl.$^6$ .................................................. G06F 11/34
[52] U.S. Cl. ............................................ 395/712; 395/180
[58] Field of Search ...................... 395/703, 701, 395/712, 180, 183.14, 183.11, 181, 705

[56] References Cited

U.S. PATENT DOCUMENTS

| | | | |
|---|---|---|---|
| 4,590,557 | 5/1986 | Lillie .......................................... | 364/200 |
| 4,833,594 | 5/1989 | Familetti et al. ......................... | 364/200 |
| 4,862,349 | 8/1989 | Foreman et al. ......................... | 364/200 |
| 5,222,217 | 6/1993 | Blount et al. ............................. | 395/325 |
| 5,577,244 | 11/1996 | Killebrew et al. ....................... | 395/703 |

FOREIGN PATENT DOCUMENTS

| | | | |
|---|---|---|---|
| 174129 | 7/1988 | Japan ................................ | G06F 9/06 |
| 2-40740 | 2/1990 | Japan ................................ | G06F 12/00 |
| 3-63733 | 3/1991 | Japan ................................ | G06F 12/00 |
| 290798 | 12/1991 | Japan ................................ | G07G 1/14 |

OTHER PUBLICATIONS

A. Silberschatz and P.B. Galvin, "Operating System Concepts" 4$^{th}$ Ed. Addison–Wesley Publ. Co. 1994) p. 5.
"Unix System V/386" Release 3.2 Programmer's Guide vol. II pp. 14–2–14–40.
Mark E. Segal et al. Dynamic program updating in a distributed computer system pp. 198–203 (1988).

*Primary Examiner*—Albert DeCady
*Attorney, Agent, or Firm*—Anthony N. Magistrale; Andrew J. Dillon

[57] ABSTRACT

A corrective service facility (CSF) includes improvements which allow a user to service products installed in a data processing system. CSF provides a text interface and a graphical user interface, the latter allowing a user to more readily control what products and files to update. Servicing is done by delta fixes, product feature servicing, and product specific servicing. The CSF can also be used from a local area network.

9 Claims, 12 Drawing Sheets

CORRECTIVE SERVICE FACILITY

This is a continuation, of application Ser. No. 07/686,225, filed Apr. 15, 1991 now abandoned.

FIELD OF THE INVENTION

This invention relates to the field of data processing, and, more particularly to improvements in a corrective service facility (CSF) for updating operating system products installed in a data processing system (DPS).

BACKGROUND OF THE INVENTION

In support of the use of IBM OS/2 products on different models of personal computers such as the IBM PS/2 personal computers, IBM has provided a CSF for use by users to update the OS/2 products and correct bugs or errors therein. (IBM, OS/2, and PS/2 are trademarks of International Business Machines Corporation). After a new version of a product has been delivered to users, some users might find bugs or errors therein. A user can then prepare an authorized program analysis report (APAR) to start a problem determination process leading to creating a "fix" for overcoming a problem. Fixes that are created after a given release or version of a product typically are included in the next release or version of the product and are available between releases on corrective service diskettes. A service diskette contains the CSF and a booting program that allows the CSF to be booted up from the service diskette. A user can then install the fixes by running the CSF to replace product files as appropriate with corrected files containing the fixes. While the old CSF has been satisfactory, a new CSF, which is the subject of this invention, has been created which not only improves upon several aspects of the old CSF but also is easier to use and includes several new functions not present in the old CSF. Such new functions will now be generally described relative to their improvement upon the old CSF. Hereinafter, the old CSF will be referred to as the "old CSF" and the new CSF will be referred to simply as the "CSF".

SUMMARY OF THE INVENTION

The invention is primarily an improvement upon the old CSF and its general nature might be best understood by first considering the major differences in features and functions between the invention and the old CSF. First, the old CSF required booting into the DPS to be serviced, from a service diskette. If the DPS was running at the time that the user decided to use the CSF, the DPS would first have to be shut down and then restarted using the service diskette. While servicing was in progress, no other task could be run. Thus, one of the objects of the invention is to allow a user to run or execute the CSF as an application program in a running system operating under the control of a multitasking operating system. When executed in such a running system, the CSF servicing is faster and products other than the one(s) being serviced can be multitasked while the servicing is being done.

Relative to a second feature, under the old CSF procedures, different levels of CSDs (corrective service diskettes) were provided, the latest level containing not only new fixes added with the new level but also cumulative fixes for all of the preceding levels. When the old CSF was run using a later level CSD, the old fixes were redone along with the new fixes. Accordingly, another object of the invention is to use a cumulative CSD but only to install the new or delta fixes therein without redoing any prior fixes already done. Such object provides the advantage of speeding up the servicing process by not having to transfer the already updated files each time servicing is performed.

Third, under the old CSF, if a user wanted to back out and return to a previous level, the original product being serviced had to be re-installed and then the desired CSD level reinstalled. Such old procedures are time consuming and tedious. Consequently, a further object of the invention is to allow a user to back out of a currently installed CSD level to a prior CSD level without having to re-install the product being serviced.

Fourth, the old CSF interacted with the user through a full screen which was character based in contrast to being graphics based. The only control the user had was to be able to exclude directories and drives by manually entering identification thereof in response to prompting. Such procedure was slow, tedious if many items were to be excluded, and prone to error. Unless a file was excluded, the old CSF updated all the files on the service diskette even though some had already been updated. Another object of the invention is to provide a graphical user interface which presents to the user a complete presentation of products that can be serviced and allows the user an improved degree of control over which items will be serviced.

Fifth, relative to the old CSF, suppose a user added a product feature after the basic product had already been installed and serviced. If the user then wanted the feature to be serviced to bring it up to the same service level as that of the already installed product, the entire product (not just the feature) would have to be serviced. Thus another object of the invention is to allow a later installed feature to be serviced without having to re-service any portion of the product that was already installed and serviced.

Sixth, the old CSF provided services that were generic to the products. If a product required product specific servicing, such servicing would have to be done in a separate operation unrelated to the CSF. A further object of the invention is to allow product specific servicing to be added to the CSF and done after the generic servicing has been completed.

DRAWINGS

Other objects and advantages of the invention will be apparent from the following description, of a preferred embodiment of the invention, taken in connection with the accompanying drawings wherein.

Figure 8A:
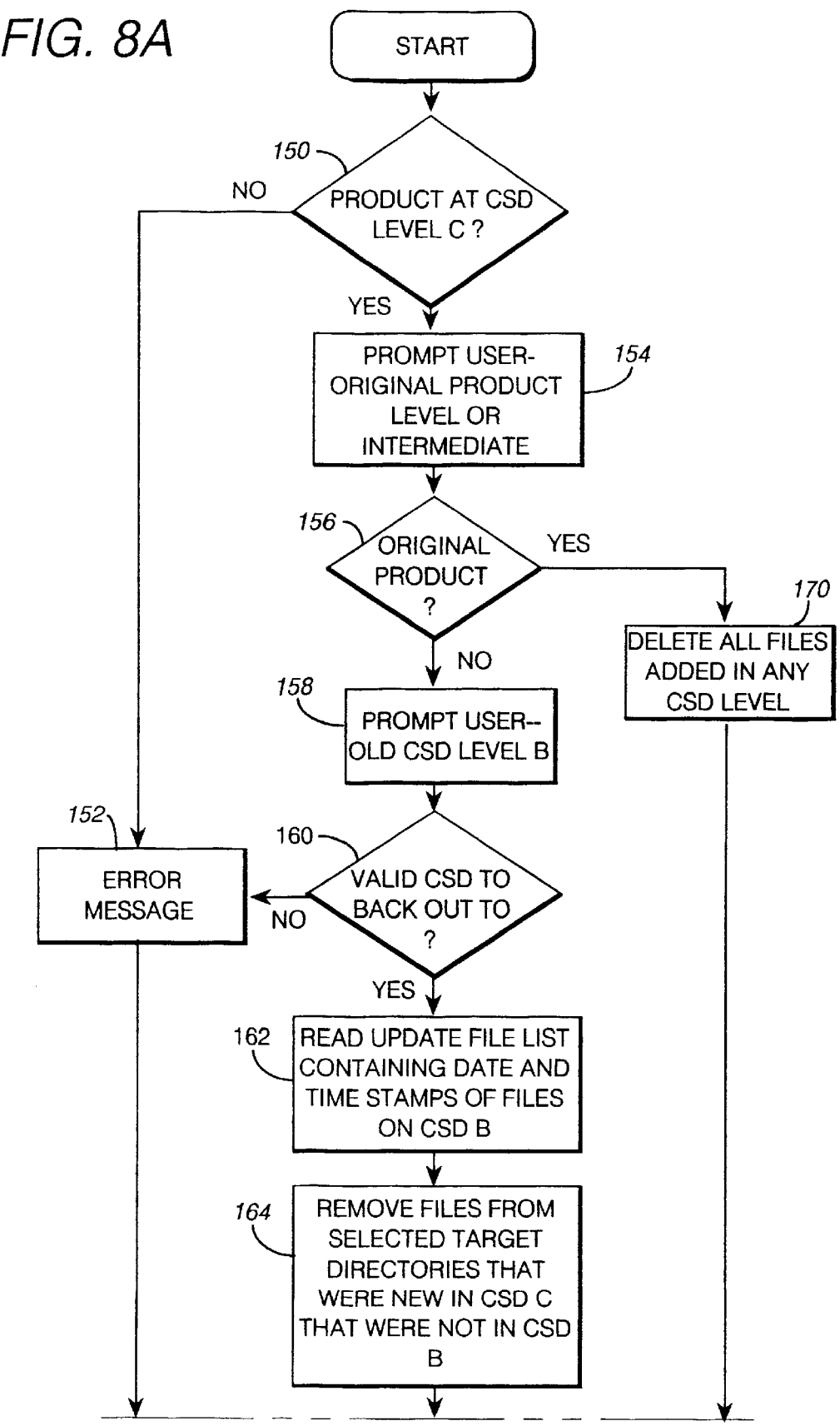
Figure 8B:
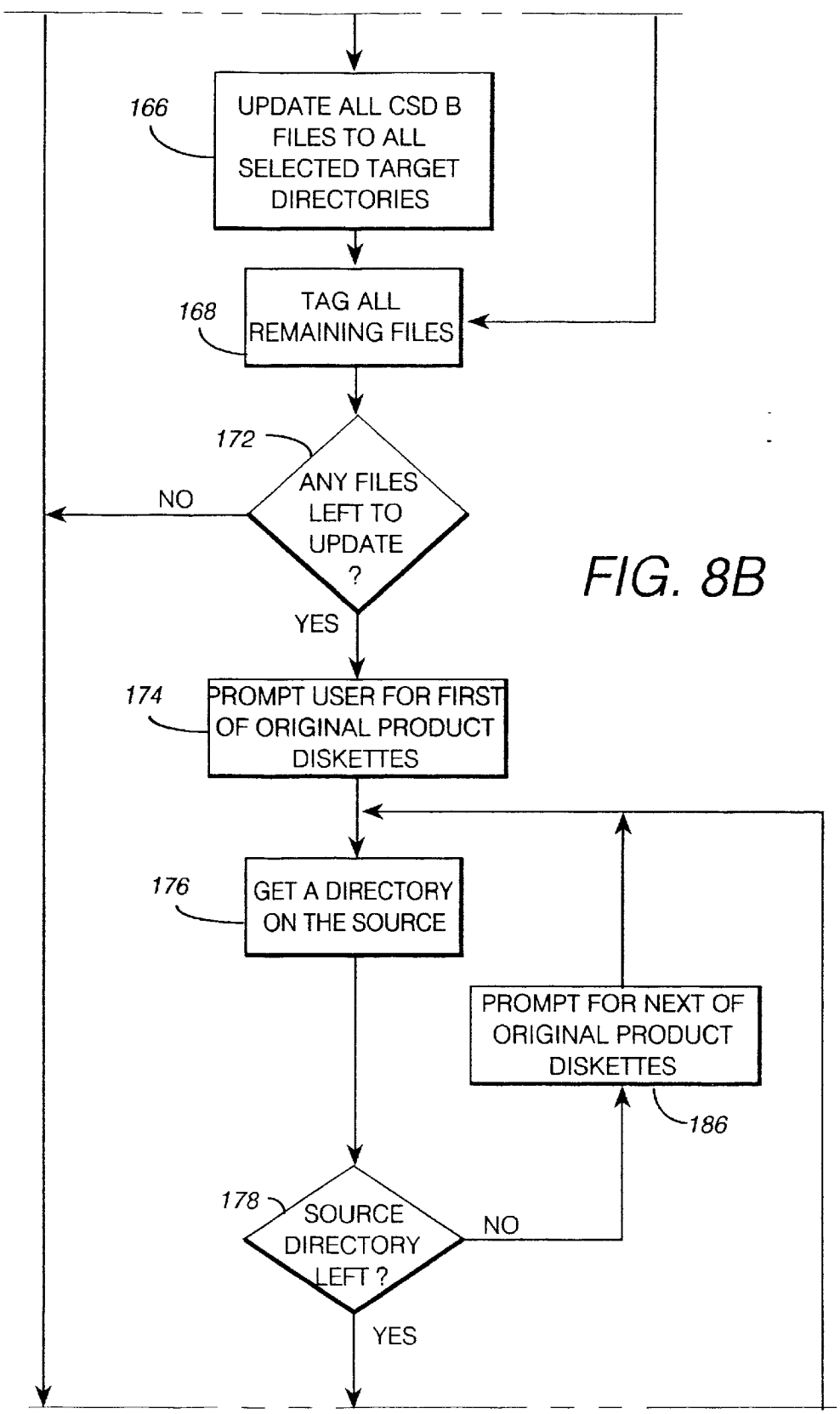
Figure 8C:
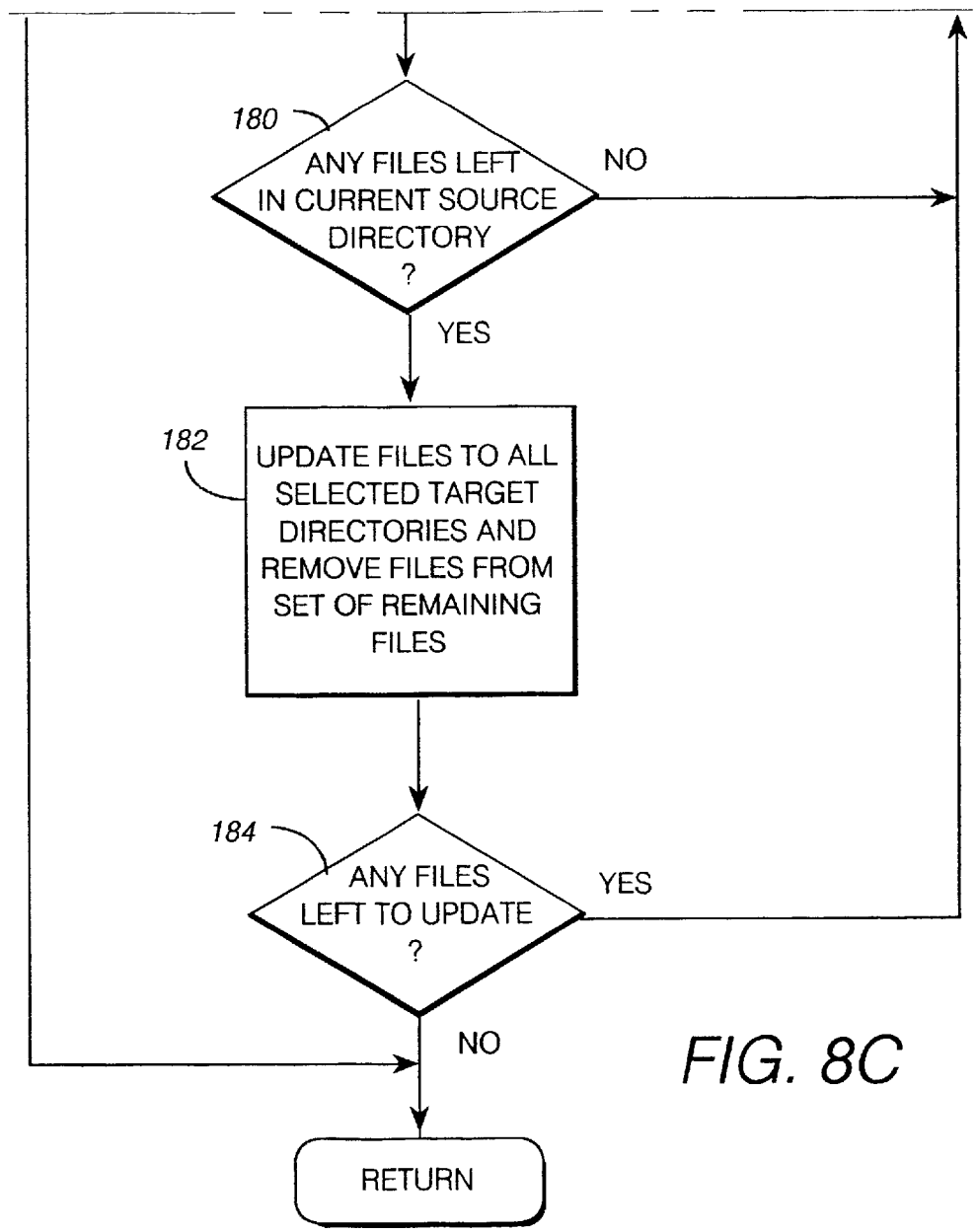
Figure 9:
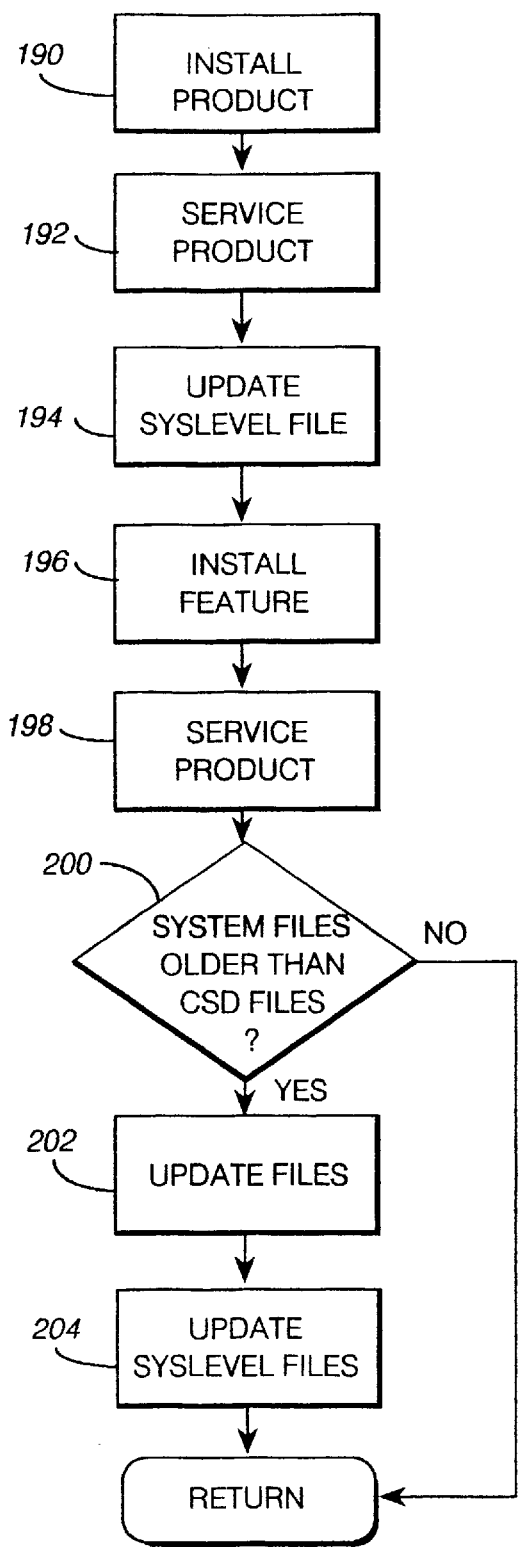
Figure 10:
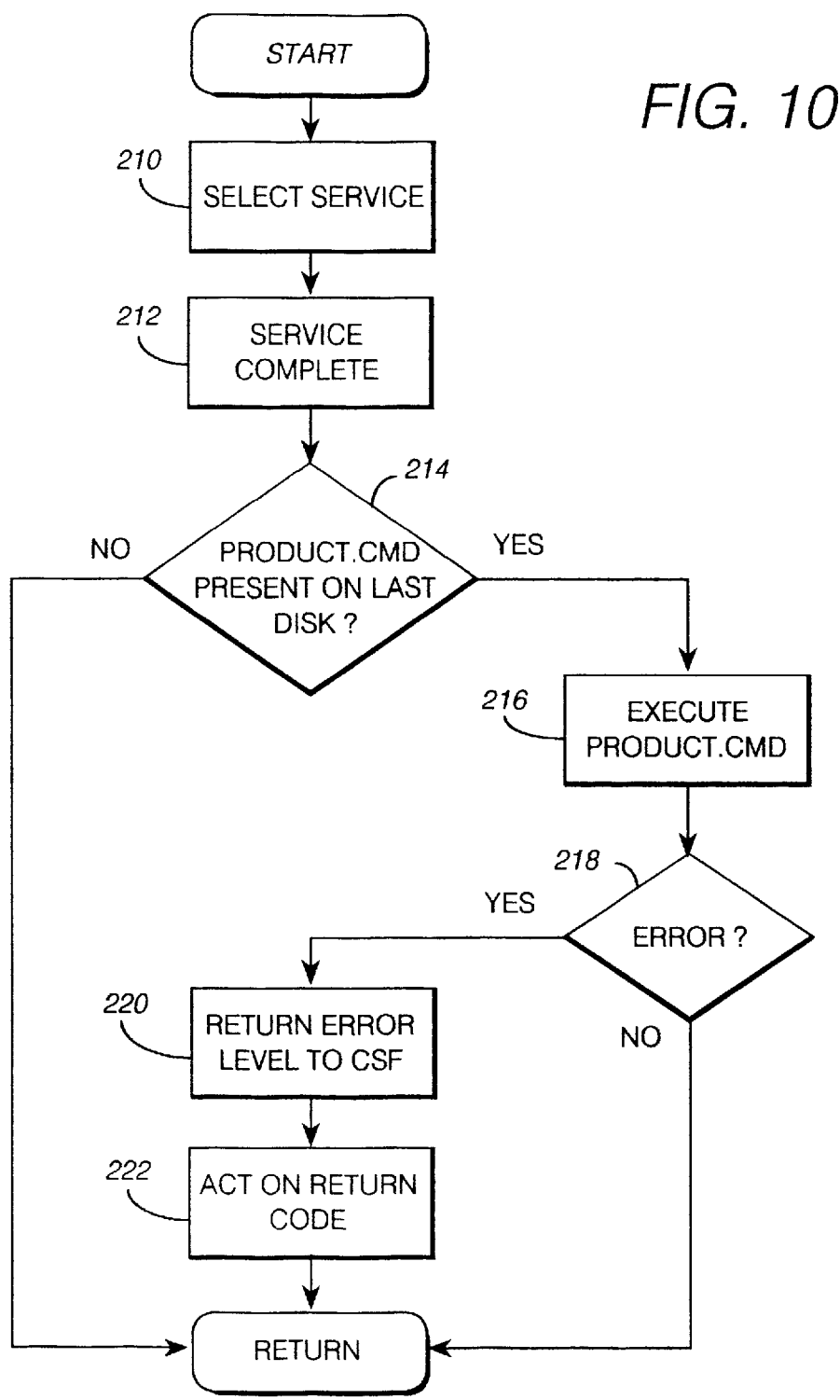
Figure 11:
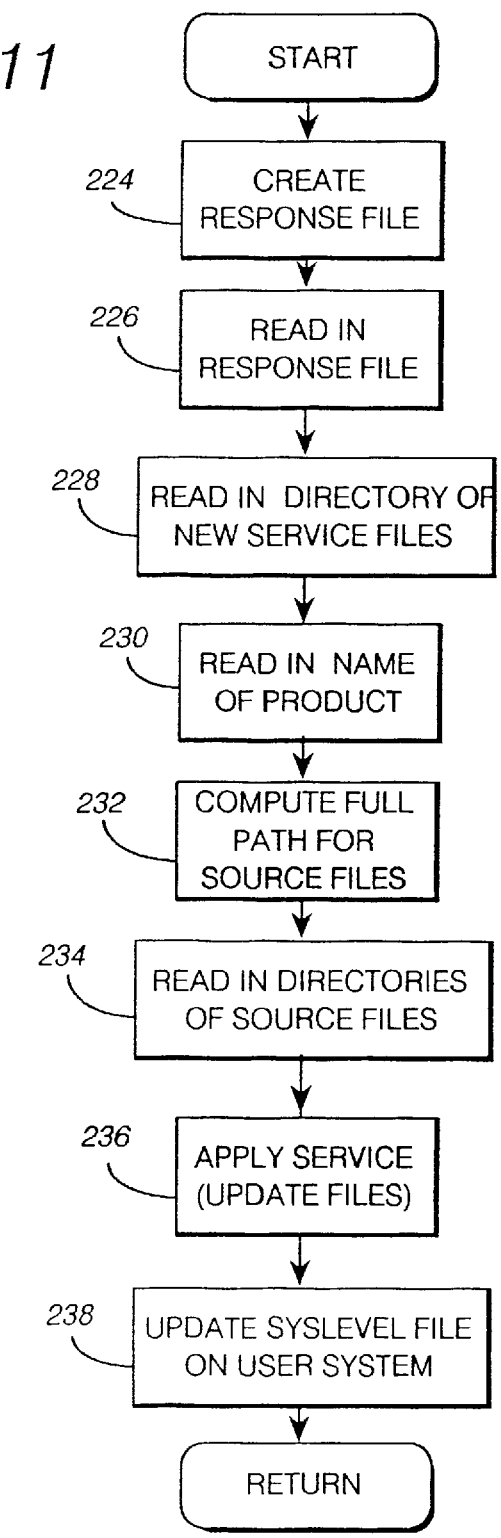

FIGS. 8A, 8B, and 8C, when placed together along the reference lines therein, form a detailed flowchart of a process for backing out of a prior fix level using the CSF;

FIG. 9 is a flowchart showing how CSF services only a feature;

FIG. 10 is flowchart showing how product specific servicing may be used with CSF; and FIG. 11 is a flowchart showing how CSF may be run from other than an A: drive.

DETAILED DESCRIPTION

Figure 1:
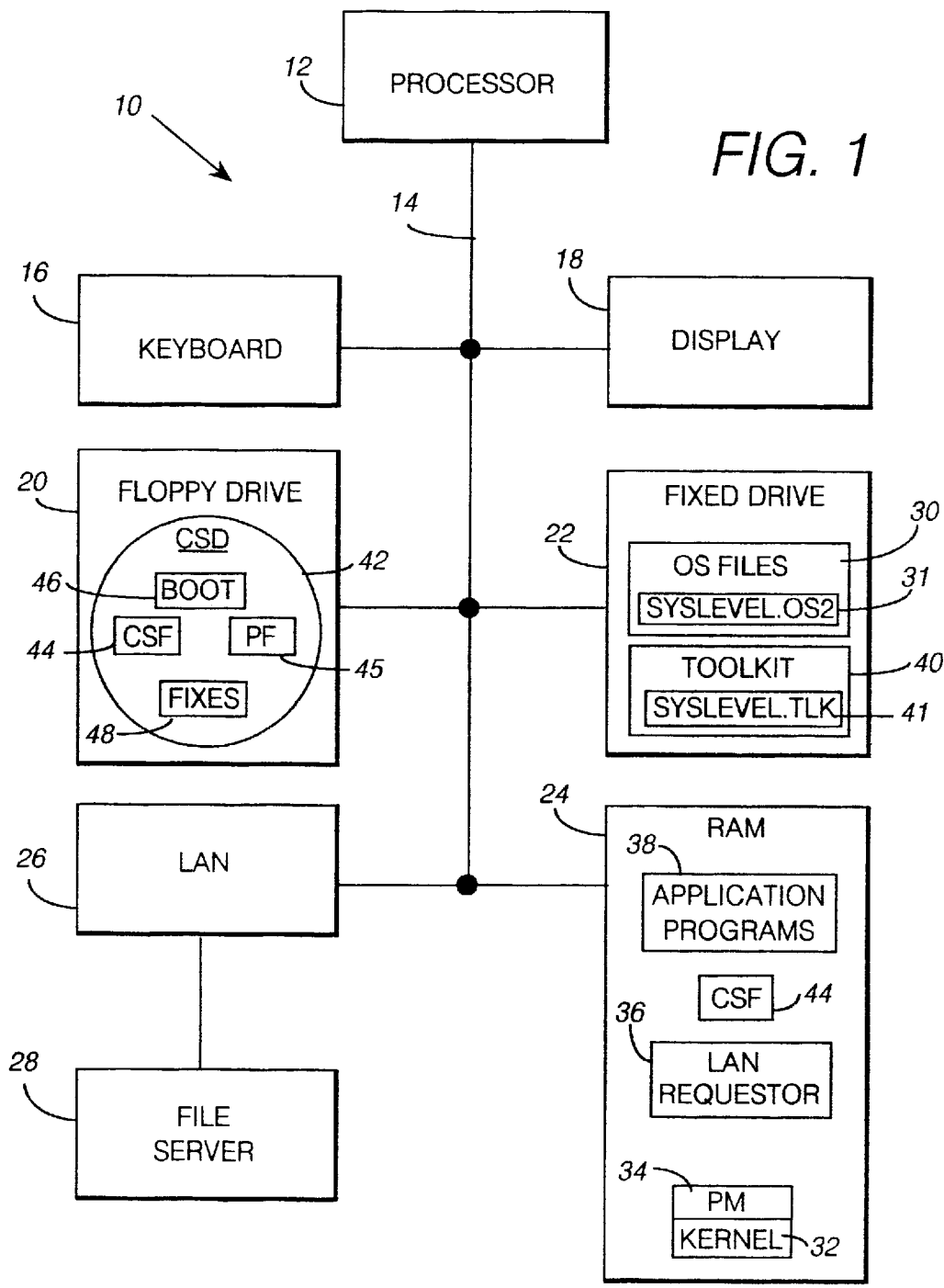
FIG. 1 is a block diagram of a data processing system embodying the invention.

Referring now to the drawings, and first to FIG. 1, there is shown a data processing system (DPS) 10 which operates under an operating system (OS) such as OS/2 Standard or Extended Edition Versions 1.3. DPS 10 is preferably a personal computer such as one of any PS/2 model that is capable of running such OS. DPS comprises a processor 12 connected to a bus system 14 which interconnects other elements of system 10. The other elements include a keyboard 16, a display 18, a floppy disc drive 20 designated as the A: drive, a fixed disc drive 22 designated as the C: drive, and a random access memory (RAM) 24. Bus system 14 is further connected to a local area network (LAN) 26 that comprises a LAN file server 28.

When DPS 10 is first initialized, the various OS programs 30 that form the operating system are typically stored in fixed disk drive 22. OS programs 30 include kernel 32 and Presentation Manager (PM) 34. Thereafter, when the system is started or rebooted, kernel 32 and PM 34 are loaded into RAM 24 and executed by processor 12 to control operation of DPS 10. PM 34 provides a graphical user interface (GUI) between the user and DPS 10. A LAN manager or requestor 36 is also stored in and executed from RAM 18 to control operation of LAN 26. The OS is a multitasking system thus allowing one or more application programs 38 to be loaded into RAM 18 and concurrently executed. Such application programs can be stored on a diskette and loaded from drive 42, or stored on drive 22 or in LAN 26, prior to being loaded into RAM 18 for execution.

The hardware and software included in DPS 10 as thus far described, are commercially available and only so much of the details and operation thereof as may be necessary for an understanding of the invention, are described herein. The novelty in the invention resides in details of CSF 44 and its interaction with different elements of system 10. Such items and interaction are described below.

CSF 44 is a program or series of routines the general function of which is to install fixes in OS/2 products that are installed in a DPS. OS/2 products currently include OS/2 Standard Edition Version 1.3, OS/2 Extended Edition Version 1.3 (which includes LAN Requestor, LAN Server, Communications Manager, and Data Base Manager). OS/2 products also include the many programs that are written especially for use in connection with an OS/2 operating system, such as OS/2 Toolkit. Thus, relative to the illustrated system, installed products include OS programs 30 and a Toolkit 40. CSF 44 is supplied to a user on a corrective service diskette (CSD) 42 that also includes a boot routine 46 for loading CSF 44 into memory, a product file (PF) 45, and one or more levels of fixes 48. A given level is defined by the dates and time stamps of the individual files and may include a plurality of CSDs dependent on the number and size of files containing the fixes.

Figure 2:
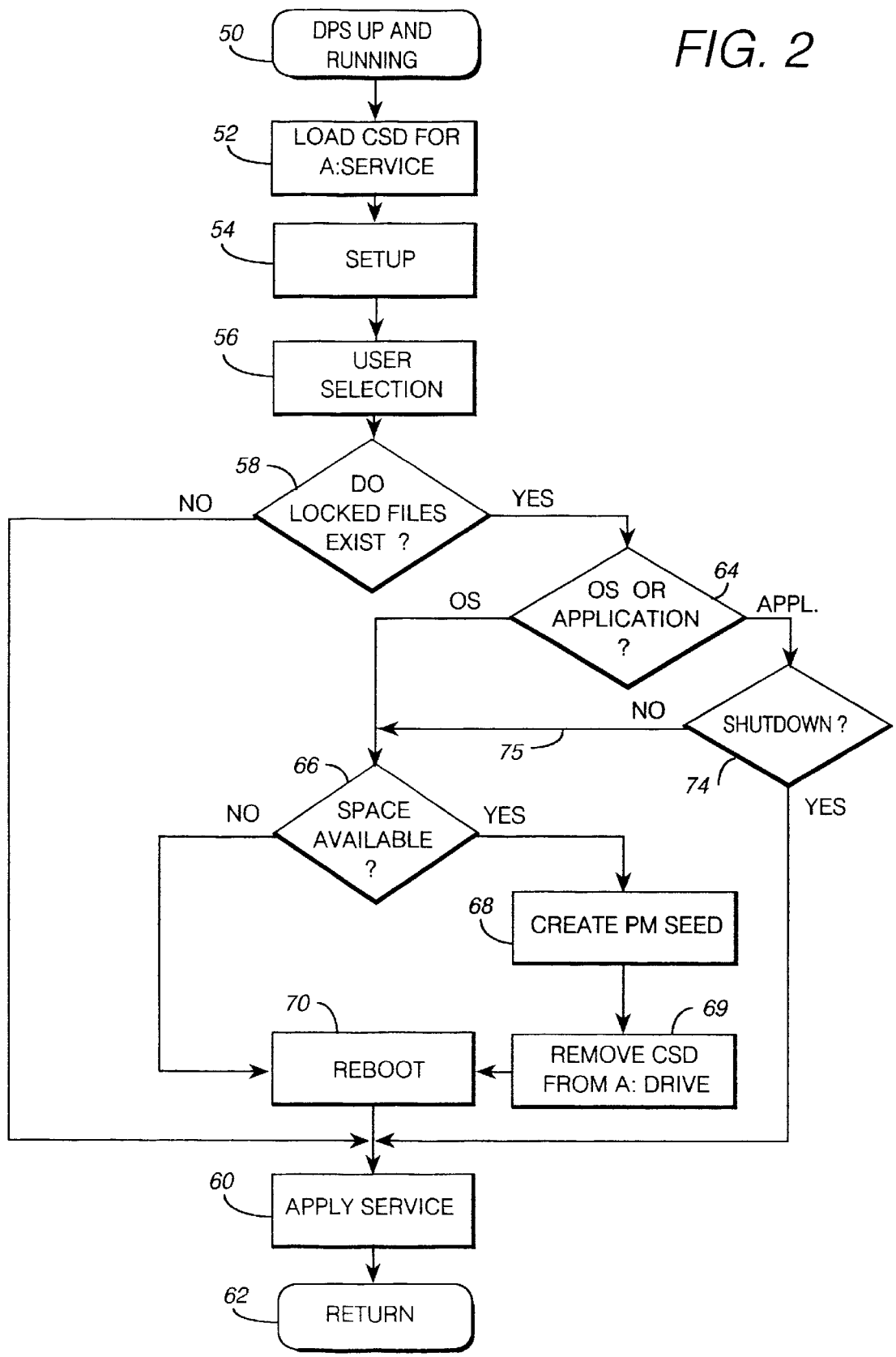
FIG. 2 is a flow chart illustrating operation of the system shown in FIG. 1 when the CSF is initiated from a running start.

CSF 44 is designed to be primarily started from an up and running DPS. The manner in which the CSF is given a running start and the general functions carried out by CSF 44 when started in a running DPS, are shown in FIG. 2. In general, service is initiated from a running OS/2 system. This is different from the old CSF which requires the user to boot from diskette up-front in order to apply service. However, CSF 44 is supplied on bootable diskettes. The strategy of CSF 44 is to try to service the different products without having to reboot the system. The CSF program takes the following steps (in pseudo code) in determining if service from a seed system is required:

```
Determine which products to service <user selected>
Determine which drives/directories to search <user selected>
Determine if shipped CSD modules are locked by the system in
    the drives/directories selected by the user
    If locked files exist
    {
        if locked files belong to operating system
        {
            Seed system required
        }
        else
        {
            do
            {
                Prompt user to shutdown product or restart system
            } while product is not shutdown or restart option selected
            if user shutdown product
            {
                No seed system required
            }
            else // restart is required
            {
                Seed system required
            }
        }
    }
    else
    {
        No seed system required
    }
```

No mechanism is provided for replacing modules while they are being used by the system. Such concept is known as "Hot Revision". Most products, other than the operating system itself, should be able to be shutdown from the running system in order to apply service to it.

Referring now to FIG. 2, preliminary to using the CSF, DPS 10 is powered up and running in step 50. Such condition implies that kernel 32 and PM 34 are loaded and operating. Further, one or more application programs 38 may be running. Next, in step 52, the user inserts CSD 42 in drive 42, the A: drive, and enters the command "A:service" to run CSF 44. Step 54 provides a user setup screen, as described in more detail with reference to FIGS. 3 and 4, followed by the user making selections in step 56 to initiate the desired service. A determination is made in step 58 whether the selected service will involve any locked files. If not, control is passed to step 60 during which the selected service is performed. Upon completion of such service, step 62 returns to the operating system.

A "locked" file is a file that is a shared resource and has been locked so that it can only be read from but not written into. Step 58 determines if any file to be serviced is locked. If so, step 64 determines if the locked file is an OS file or an application file. If step 64 determines the locked files belong to the OS, then step 66 analyzes how much free space is available on fixed drive 22. If there is at least about 2.5 Megabytes space available, then step 68 creates a PM seed and stores it on drive 22. A "PM seed" is a collection of the minimal number of OS files for running the OS while providing PM support. The seed also includes a boot program allowing the seed to be booted from fixed drive 22 into the DPS.

The seed system is a mechanism by which service can still be applied from the fixed disk instead of diskettes. When the seed system is created, the user reboots from the hardfile instead of diskettes. One of the primary reasons for creating the seed system is that the CSF program is a presentation manager application and all the PM DLLs cannot be contained on one diskette. Furthermore, this seed system sets the stage for creating a mechanism that contains the necessary LAN files to connect to a server so that service can be applied from a host.

An important note is that only those files that are locked during service will be transferred to the seed system. Therefore, CSF will spend a minimal amount of time in setting up the seed system. In the worst case, if "all" files in the system are to be serviced, then a seed system consisting of both basic OS and PM files would require approximately 2.5 MB of temporary storage.

Step 69 follows step 68 and prompts the user to remove the CSD from the A: drive thereby allowing the PM seed to be rebooted from the fixed drive. If step 66 determines there is less than such amount of free space, step 66 branches to step 70 wherein the system is rebooted. If step 64 determines locked files are in the application files, step 74 then prompts the user to shutdown the application. If this cannot be done or the user doesn't know how to do so, a branch is made along path 75 to step 66 and subsequent steps. If it can be done, once the application is shutdown, then service can be applied through step 60 provided there are no OS locked files.

Following either of steps 66 or 69, step 70 reboots the system after which the selected service is done in step 60. The rebooting is initiated by sending the user a prompt to do so, such as by pressing the CTRL, ALT, and DEL keys on keyboard 16. During step 70, DPS 10 is rebooted either from the boot program 46 in CSD 42 if the CSD is still in the A; drive or by the PM seed created in step 68 if the CSD is removed from the A: drive.

Figure 3:
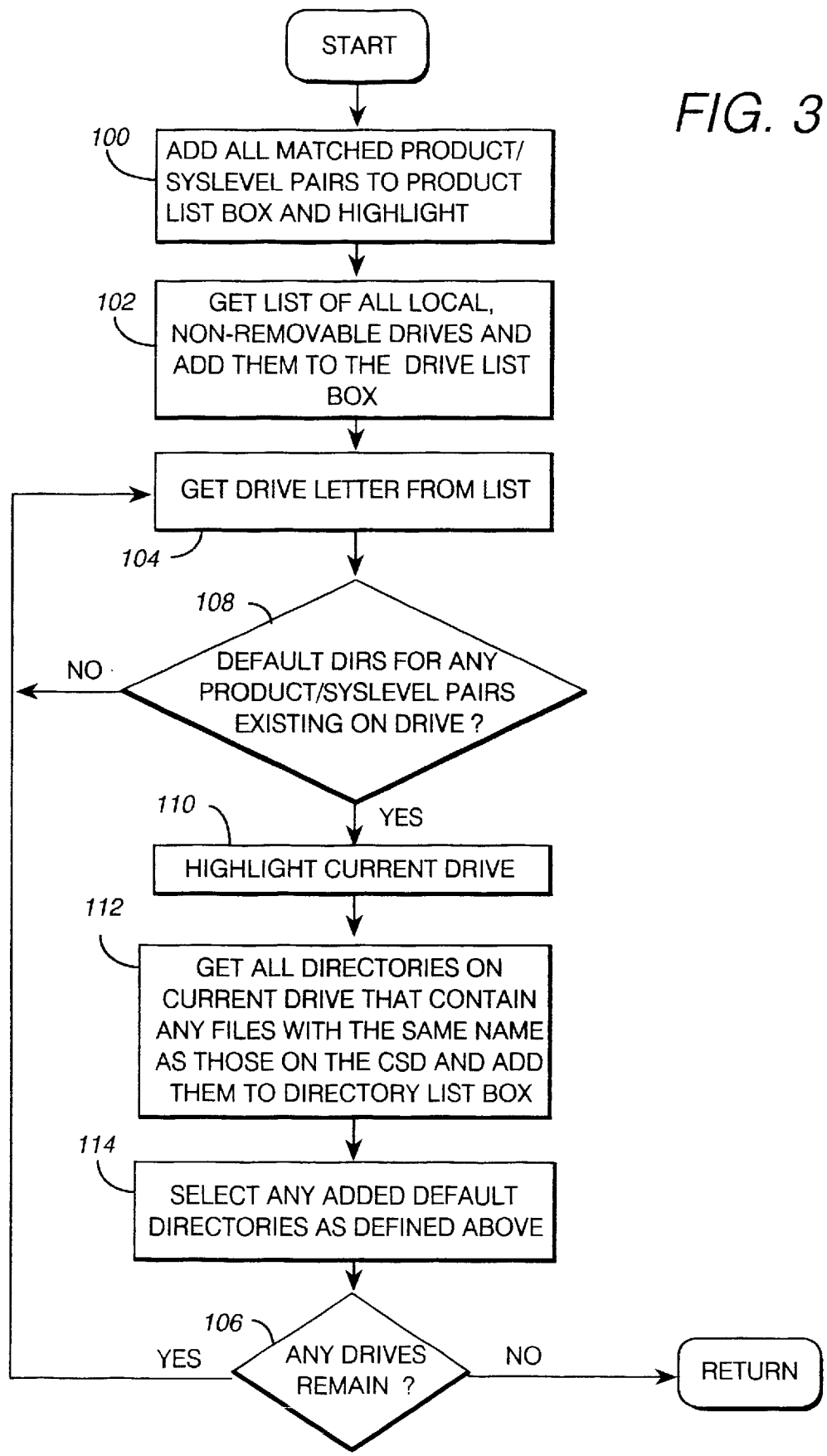
FIG. 3 is a flow chart illustrating details of a portion of the setup operation shown generally in FIG. 2.
Figure 4:
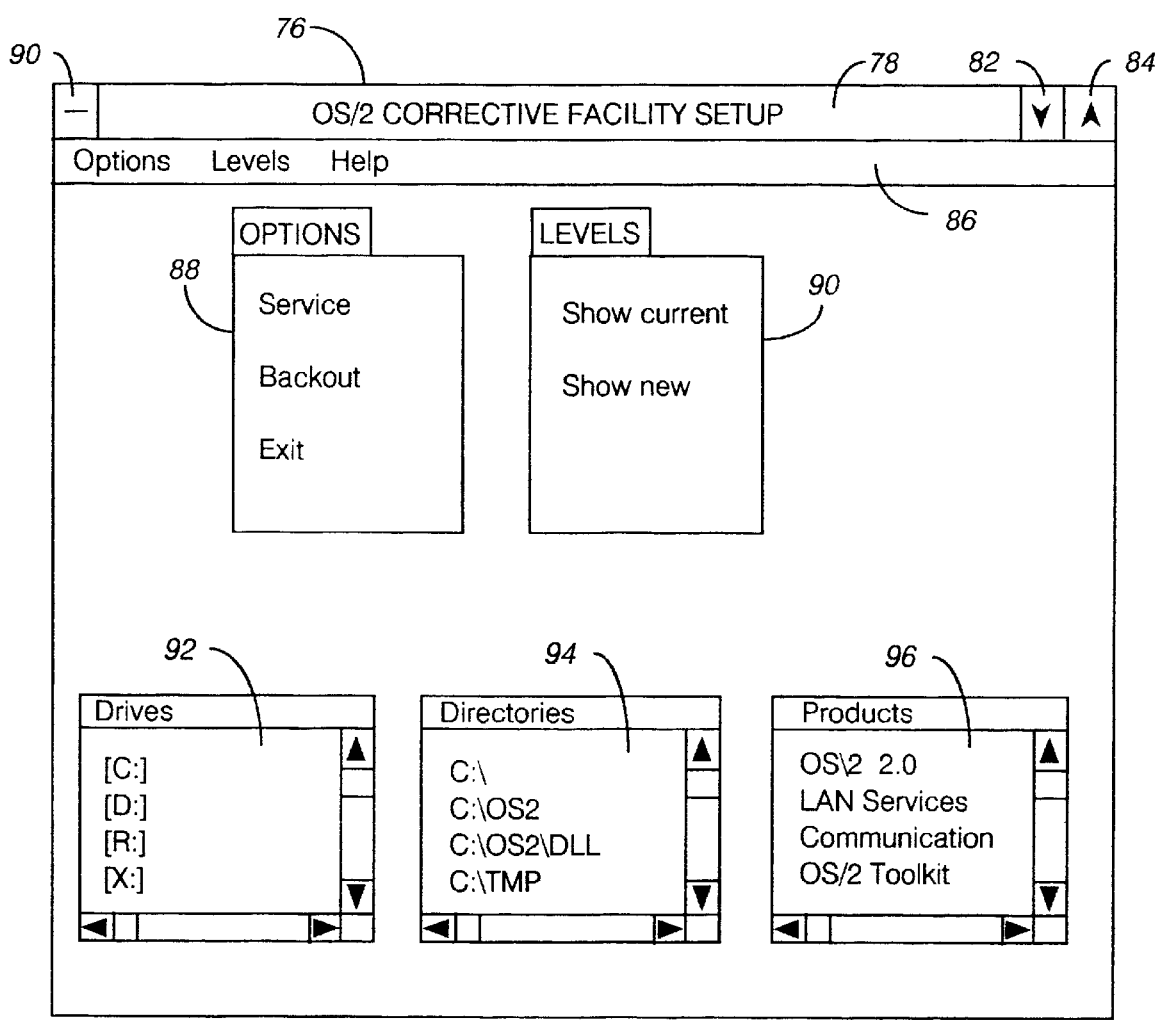
FIG. 4 is a diagram of an exemplary display screen produced during the setup operation shown in FIG. 3.

The details of the setup operation illustrated in FIG. 3 might be more readily understood by first discussing the general results thereof. As previously indicated, CSF 44 is primarily intended to be started from a running system so as to gain an ease of use advantage obtained by using the graphical user interface provided by PM 34. When so started, CSF 44 displays an introductory window (not shown) followed by the window or display screen 76 shown in FIG. 4. Such screen is similar to many standard screens currently being publicly used on commercially available systems and so only a general description need be made thereof. Screen 76 contains a title bar 78 bearing the title "OS/2 Corrective Service Setup" identifying the procedure producing the screen. A control menu button 80, a minimize button 82, and a maximize button 84 are in line with the title. A menu bar 86 lists three menus "Options", "Level", and "Help" which when selected cause pull down menus to appear. The Help menu aids a user and the details thereof form no part of the invention.

An Options menu 88 and a Levels menu 90 are illustrated, it being understood that only one pull down menu can be viewed and used at any given time. Options menu 88 provides a list of different CSF functions the user can select, the functions being "Service", "Backout", and "Exit". When "Service" is selected, delta fixes servicing, product feature servicing, and product specific servicing are done as described below relative to FIGS. 7, 9 and 10 respectively. When "Backout" is selected, backout servicing is done as explained below relative to FIG. 8 When "Exit" is selected, CSF is exited and control passes to some other program. Levels menu 90 lists "Show current" and "Show CSD" which respectively allow the user to view information from syslevel files concerning the current product versions and their level of servicing and from a CSD to see what products and files can be serviced. The user makes selections and choices, changes selections, and enters information through standard PM keyboard and/or mouse procedures.

Screen 76 also contains three windows 92, 94, and 96. Such windows contain conventional scroll bars along their bottom and right edges allowing the user to scroll through the contents of the windows. These windows have dedicated functions and may be referred to hereinafter using names descriptive of such functions. Window 92 contains a list of drives and is called a "drive list box". Window 94 contains a list of directories and is known as a "directory list box". Window 96 contains a list of Products and is know as a "Product list box". During setup 54 (FIG. 2), the various lists in such boxes or windows are filled in.

Each entry in product list box 96 represents a product/syslevel pair. That is, it represents a matched pair of entries, one entry residing in PF 45 and the other in a syselvel file of the corresponding product installed on DPS 10 , such system being also deemed the "target" system This match occurs only if the product file entry and syslevel entry represent the same product and version, and the product entry is at the same or higher CSD level than the syslevel entry. The product file entry corresponds to a service file, and the syslevel entry corresponds to an installed file.

Associated with each product/syslevel pair are two sets of directories, a Product directory set and a syslevel directory set. The Product directory set contains a set of generic default directories in the form dir\dirpath. The syslevel directory set lists directories where the original product was installed or the set of directories that were serviced if a CSD was applied to such product. A "default" directory is the directory name that is assigned by a product when it is installed unless the user overrides the default and selects a different directory name. The use of a non-default name allows a user to install two copies of the same program on a system thereby allowing one copy to be serviced while retaining the other copy as a backup.

During setup step 54, the drive, directory and product list boxes 94, 96, and 98 are initialized in accordance with the operations illustrated in FIG. 3. Referring now to FIG. 3, in step 100, by a process of searching and comparing, all matched product/syslevel pairs are added to product list box 96, and highlighted on the display. Step 102 then creates a list of all local, non-removable drives and adds such list to drive list box 92. Step 104 then selects a drive from such list. Step 108 determines if any default directories for any product/syslevel pairs exist on the drive selected via step 102. If none exists, a branch is made back to step 104 to repeat the loop. When a positive determination is made via step 108, step 110 then highlights the current drive. Step 112 then finds or gets all of the directories on the current drive that contain any files having the same names as those on the CSD and adds such directories to directory list box 94. Step 114 then selects any added default directories as defined previously. Step 106 determines if any drives remain. If none is left, the routine ends and control is returned to the system. If any drive remains, a loop back to step 104 is made.

In summary of the CSF operation described above, a window 76 will appear displaying default information about the type of service that can be applied. This service is determined by the information on the first CSD if more than one CSD is provided for a given level. The user can modify any of the default choices or simply accept the default selections and service them accordingly. The default selections when the CSF program is started are the following:

1. All applications available for service will be highlighted and displayed.

2. Those drives containing the default directories of the applications will be highlighted, but all drives available will be displayed.

3. All directories for the highlighted drives that contain serviceable files will be displayed with the default directories highlighted.

4. Those drives and directories previously serviced for the selected products will be highlighted.

The "Products" list box 96 displays along the side of the name of the product/program the drive letter of where the product is found on the user's disk(s). This is required because there could be multiple occurrences of the same product on different drives. Furthermore, if multiple copies of the same product are found on the same drive then the location of the associated syslevel file is displayed along the side of the drive. This way the user can choose exactly which copy of the product is to be serviced. Essentially, CSF 44 tries to guess the user's response and therefore minimize the user's interactions (steps).

Since the "new" CSF program is started from a running system, all user inputs occur from the combined running of the PM and the CSF programs. This is a major enhancement. When the old CSF was being used, it was very clumsy to input the drives and directories to include and exclude during service. If no seed system is required or if a PM seed system is created, all information displayed to the user is in the form of PM windows and dialog boxes. If a CSD reboot is required, all information displayed to the user after the reboot is in the form of IDF panels. This is the same display facility used during the installation of OS/2 1.3 SE and does not require any PM files.

Figure 5:
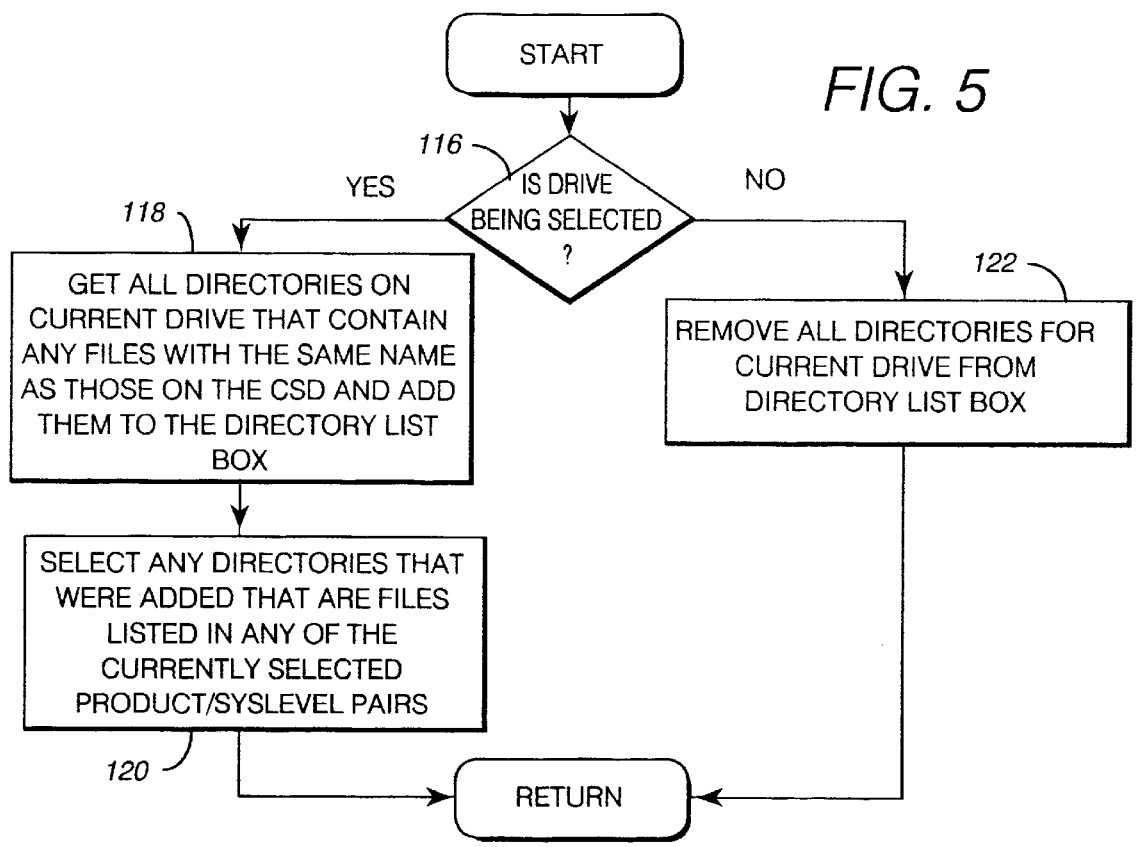
FIG. 5 is a detailed flow chart of the drive selection portion of the user selection process generally shown in FIG. 2.

FIG. 5 illustrates what happens when the user clicks on a drive in drive list box 92. Step 116 make a determination if the drive is being selected or deselected. A drive is "selected" by the user highlighting the entry in the drive list box and a drive is "deselected" by turning off highlighting of the entry. If a drive is selected, step 118 then gets all the directories of the current drive that contain any files having the same names as those on the CSD and adds them to the directory box list. Step 120 then highlights any default directories that were added that contain files listed in any of the currently selected product/syslevel pairs. If step 116 results in a negative determination, ie, the drive is deselected, step 122 removes all directories for current drive from directory list box 94.

Figure 6:
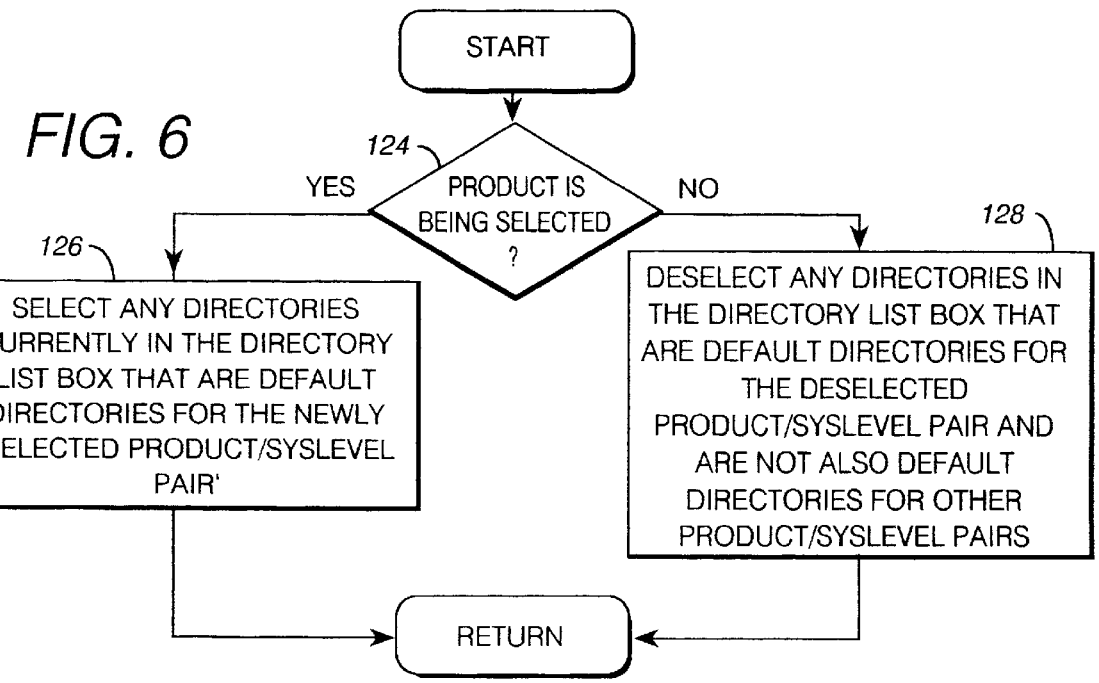
FIG. 6 is a detailed flow chart of the product selection portion of the user selection process generally shown in FIG. 2.

Referring to FIG. 6, when a user clicks on a product in product list box 96, step 124 determines if the product is being selected or deselected. If so, step 126 displays and highlights any directories currently in directory list box 94 that are default directories for the newly selected product/syslevel pair. If not, step 128 deselects any directories in directory list box 94 that are default directories for the deselected product/syslevel pair and are not also default directories for other product/syslevel pairs.

Before a detailed discussion is given, an overview of the operation of CSF 44 might be useful. CSF determines which products exist in the target system by searching for syslevel files. If any of the these files match corresponding files on the CSD diskettes, an update is initiated. The user may only update the default directories or add and delete directories. The user may also select which of the valid products to update.

CSF uses an iterative algorithm to search for all the files and directories on the fixed disks. The decision to use an iterative versus a recursive procedure was made as stack space can be rapidly consumed considering the fact the directory structures can be nested several layers deep and each fully qualified file name can be up to 256 bytes long. Within each directory, all files/directories that match the required criteria are found and put into a linked list. A pointer to the beginning of the linked list is returned. Another pointer is used to move down this list and step into each directory. As more files/directories are found they are appended onto the list. This procedure for searching for files/directories is then repeated for each valid drive that exists on the DASD. Removable (or external) and network drives are not considered.

CSF maintains several dynamically created linked lists such as a linked list of drive letters, linked list of all directories, and a linked list of syslevel files. Since these lists can grow or shrink dynamically and can be of widely varying sizes, memory is allocated from the heap on the fly, so that only as much memory needed is allocated and the program need not reserve large blocks on the stack in advance.

In the event that files are encountered that must be replaced but cannot be overwritten, CSF sets up a seed system so that all normal system files can be replaced. This involves searching for DLL's, data files and system files that cannot be overwritten and copying them into temporary directories and creating a temporary config.sys with these temporary directories prepended to DPATH, PATH and LIBPATH. After service is complete, the user's system is restored to its original state.

Different types of servicing occur during step 60 (FIG. 2) including applying delta fixes, backing out of prior fixes, servicing only a feature of a product, and product specific servicing. The respective details of such servicing are shown in FIG. 7–10. CSF is supplied in service diskettes that are cumulative with respect to fixes on modules. For example, the first CSD ships three fixed modules. A second CSD later ships those first three fixed modules plus the new fix modules. This allows for a user to bring a system to the most recent CSD by simply applying the last CSD shipped.

The old CSF automatically applied all files shipped in a CSD without regard to if the file already exists on the user's system from a previous CSD. This is very time consuming. CSF 44 does not automatically replace every file. Instead, CSF 44 checks the time, date and filename to determine if the file on the CSD shipped is different from the one installed. If the data matches then no replacement of that module occurs, otherwise the module is replaced. This design eliminates the time involved in replacing all files on the system when only a few have to be replaced. Essentially, only the delta fixes between the new CSD and the last CSD are applied. This happens transparently to the user who does not have take any extra steps to accomplish the delta CSD. This design eliminates the time involved in replacing all files on the system when only a subset have to be replaced. At the end of this process, a syslevel file for the product on the user's system is created with the latest CSD information.

Figure 7:
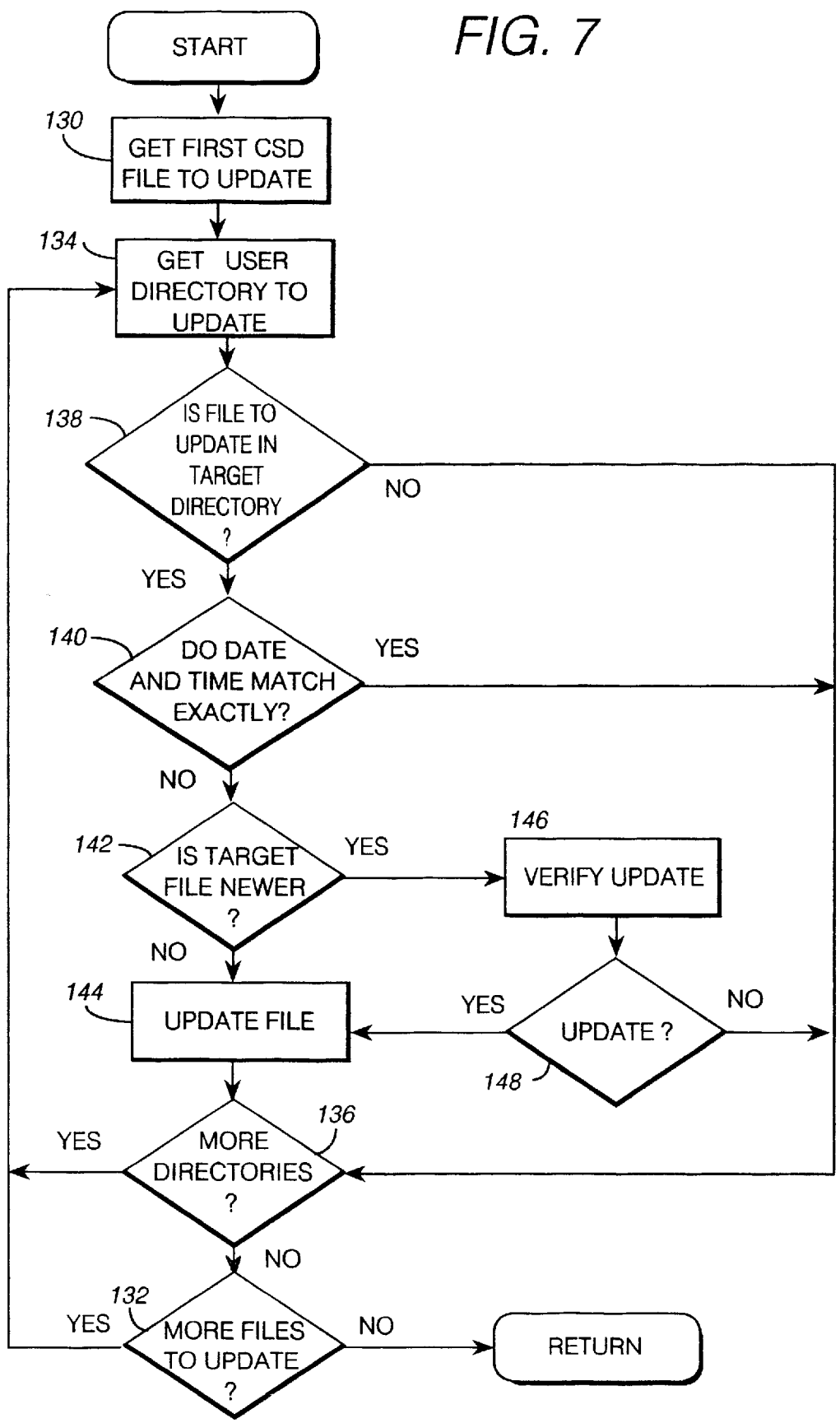
FIG. 7 is a detailed flow chart for delta fixes of the CSF.

Referring now to FIG. 7, step 130 gets the first CSD file for updating. Step 134 gets a user directory to update. If so, step 138 then determines if the file to be updated is in the target directory. If not, a branch is made to step 136. If so, step 140 then determines if the date and time stamps of the CSD file and the target file are an exact match. If so, the target file has not been changed since the last update and there is no need to do it again. If not, step 142 determines if the target file is newer than the CSD file. If it is not, step 144 updates the target file by replacing it with the CSD file. If the target file is newer, step 146 then prompts the user to verify the update. If an update is needed, step 144 performs the update. If no update is needed, step 148 loops back to step 136. Step 136 determines if there are more directories. If not, control loops back to step 132.Step 132 determines if there are any remaining files. If not, the routine ends. Steps 136 and 132 loop back to step 134 if there is another directory or file.

Backout is a function by which a bad CSD can be removed from the system and the system returned to the previous level of CSD without having to reinstall the entire system and then apply the entire next to last CSD again. The old CSF has no mechanism for backing-out a "bad" CSD. The current steps required to obtain the same results are very time consuming and tedious. CSF 44 drastically alleviates this problem. The user chooses the "Backout" selection from the Options pulldown menu 88. This action causes CSF to take from the previous CSD applied those modules that were modified by the "bad" CSD. Those files that exist in both the previous CSD and in the "bad" CSD but were not changed in the "bad" CSD do not have to be replaced. Finally, CSF prompts the user for the initial installation diskettes so that those modules that were only modified by the "bad" CSD can be taken from the original installation diskettes. Files with an attribute of "NEW" on the "bad" CSD obviously are not replaced. These files are erased from the fixed disk(s).

The backout corrective service procedure can be characterized as backing out of CSD level C to the original product level A or an intermediate CSD level B. Thus, referring to FIG. 8, step 150 determines if all of the selected product/syslevel pairs are at CSD level C. The reason for this is that all selected products to be updated must be at the same CSD level as the level of the CSD from which the service was initiated. The target CSD level is obtained from the syslevel files corresponding to the selected products. If step 150 determines negatively, step 152 sends an error message and the routine ends and returns control to the system. If step 150 results in a positive determination, step 154 sends a prompt to the user allowing the user the choice of returning to the level A of the original product or to an intermediate level B of a CSD. Step 156 determines which choice is made by the user. If the user elects to return to an intermediate level, step 158 prompts the user to insert the first diskette of CSD level B. Step 160 determines is it is a valid CSD to back out to. If not, a branch is made to step 152 to send an error message to the user. A valid CSD must contain all selected products with the same versions with a CSD level less than that of the level being backed out of. If step 160 results in a positive determination, step 162 reads an update file list containing date and time stamps for files on CSD B. Then, step 164 removes those files from selected target directories that were in CSD C that were not in CSD B. Step 166 updates all files in CSD B to all selected target directories. Step 168 then tags all remaining files. If step 156 indicates the choice of backing out to the original product level A, step 170 then deletes all files added in any CSD level for that product, and a branch is made to step 168.

All files updated in CSD C that were not new in CSD C and were not updated in CSD B must be obtained from the original product diskettes. Thus, step 172 decides if there are any remaining files to update. If not, the routine ends. If so, step 174 prompts the user to insert the first of the original product diskettes. Step 176 then gets a directory on the source. The first time, this step gives base (root) directory.

On subsequent iterations, all subdirectories of the base directory are given in order. Next, step 178 determines if any source directory remains. IF so, step 180 decides if there are any remaining files in the current source directory. If so, step 182 updates the files to all selected target directories and removes updated files from set of remaining files. Step 184 determines if there are any remaining files to be updated. If not, the routine ends. If so, a branch or loop is made back to step 176 to repeat the process as appropriate. If step 178 produces a negative result, step 186 then prompts for the next of the original diskettes to be inserted. Upon finishing step 186 and in response to a negative answer from step 180, a branch back to step 176 is also made.

In the flow chart of FIG. 9, the initial steps 190–196 occur to set up the circumstances under which the remaining steps 198–208 can be performed to service a feature of a product instead of the whole product. Step 190 first installs a product, e.g., base OS/2 but without a feature. Such product is serviced in step 192 by applying CSD #1 and syslevel.os2 is updated in step 194. Later, the user adds subsystems or features in step 196 to the product, such features being a communications manager or a LAN requester, for example. Step 198 then services the product including the new features in the following manner. Step 200 decides if the files on the user's system are older (date and time stamp) than those on CSD diskettes. If not, the base product remains unchanged, no update need be done since the entire product (base plus features) are at the same CSD level, and the routine ends. If so, step 202 updates only those files in the newly added subsystems. Step 204 updates the syslevel files to bring the entire product up to the same CSD level and the routine ends.

CSF 44 is a generic tool that can be used by any product or application for applying service. It is not the intent of the CSF program to be specific to any one products' special requirements. CSF makes available an interface by which a product can apply product-specific service that falls outside the range of the generic functions offered by CSF. Product-specific servicing is defined as a means by which an application can accomplish a specific and different service task. For example, if an application needs to modify a user's configuration file, the product-specific portion of service is responsible for that task since the CSF does not have any function that modifies such files.

If the CSF program finds a file named PRODUCT.CMD on the last service diskette of a product, CSF invokes the file and executes the product-specific program. Such program will not be able to display any information to the user. CSF displays a generic window informing the user that service is still in progress. The product-specific program will be able to return an ERRORLEVEL to the CSF program. CSF is able to act on that return code.

FIG. 10 shows the overall process for product-specific servicing. In step 210, service is selected as previously described. Such service is generic. The normal CSF service is performed in step 212 and upon completion thereof, step 214 decides if a program named "product.cmd" is present on the last CSD disk. If not, the routine ends. If so, step 216 executes the product.cmd program to provide the product specific service. Step 218 decides if an error occurred during sept 216. If not, the routine ends. If so, step 220 returns an error level to CSF and step 222 then acts on the return code, as appropriate before ending the routine.

FIG. 11 illustrates a process by which servicing may be done from sources other than drive A:, e.g., by using CSD files located on a hard drive of file server 28 (FIG. 1). LAN requesters connected to the server can then be updated by downloading replacement files from the server. As a preliminary step, the LAN system administrator in step 224 must create a response file. The response file contains the following information: specify directory where source CSD files are located; name of product to be serviced; target location for syslevel file; and list of selected directories where the target files are.

As an example, a response file contains the following statementa which are needed by the service program to properly service the system:

```
:SERVICE <CS path>
; path where the new service files are located
; argument is used only for LAN service
:DIRLIST
; list of drive/directories to be updated
C:\OS2\DLL
; example
F:\OS2\SYSTEM
; example
X:\TEMP
; example
:ENDDIRLIST
:PRODUCTLIST
OS2 C:\OS2\INSTALL
;"OS2" is the directory on diskette/LAN which contains
service files
;"C:\OS2\INSTALL" directory on user's system where
SYSLEVEL.xxx is located
OS2 F:\OS2\INSTALL
OS2 X:\TEMP\OS2\INSTALL
TLK D:\TOOLKT13
:ENDPRODUCTLIST
```

In place of :SERVICE, the following statement can be used for backout service:

```
:BACKOUT <CS path> <Bad CS path> <Original path>
; paths for the new, bad, original files
; are located
; argument is used only for LAN service
```

In the above statements, the ":" indicates a command, while a ";" indicates a comment.

In response to a requester requesting service, step 226 then reads the response file into DPS 10. Step 228 then reads in the directory of where the service files are located. Step 230 reads in the product name. Step 232 then computes the full path for the source files. Step 234 reads in a list of directories containing the target files. Step 236 then applies service to update the necessary file. Step 238 updates the syslevel file on user system in accordance with the updates and the process ends.

While the invention has been described in detail relative to a specific exemplary hardware system and OS/2 products, it should be obvious to those skilled in the art that invention can readily be embodied in other hardware and software. It should also be apparent to those skilled in the art that many changes can be made in the details and arrangements of steps and parts without departing from the scope of the invention as defined in the appended claims.

What is claimed is:

1. A data processing system (DPS) comprising:

a processor;

a main memory for storing programs for execution by said processor which products include a multitasking operating system (OS), a graphical user interface program (GUI), and application programs;

a display for presenting to a user a plurality of screens including at least some generated by said GUI;

input means allowing a user to interact with said system through screens generated by said GUI program;

fixed drive means for storing a plurality of installed files of different program products and a plurality of syslevel files for such products, said program products including said OS and said GUI;

a floppy disc drive;

corrective service diskette means (CSD) inserted in said floppy disc drive, said CSD storing a plurality of service files containing cumulative fixes for a plurality of said program products installed in said DPS, said CSD further comprising a selectively operable corrective service facility (CSF);

said CSF being started in a running DPS and executed by said processor as an application program concurrently with other application programs under said multitasking operating system to provide setup means and servicing means without having to first shut down said DPS;

said setup means being operative to automatically search through said service files on said CSD and said installed files in each of said plurality of program products on said fixed drive means to find matching pairs of files with each file in each pair having an identical file name, said setup means interacting with said GUI to provide a setup screen presenting to the user a list of said matching pairs and a menu for selecting normal or backout service to be performed; and said selectively operable servicing means being responsive to user selection thereof to automatically replace each installed file of said matching pairs with said service file in each pair only when said installed file is an earlier version of a service file of the same name, so as to thereby install only a selected portion of said cumulative fixes where normal service is selected and to automatically replace each installed file of said matching pairs with said service file in each pair only when said installed file is a later version of a service file of the same name, so as to restore said installed files of a product to an earlier level without having to reinstall such product.

2. A data processing system in accordance with claim 1 wherein:

said setup means is operative to create lists on said setup screen of products associated with said installed files and of drives in said DPS containing installed products, said setup means being further operable to highlight default items on said lists, whereby the user can choose to service only said highlighted default items or to change which items are highlighted and service only those items which are highlighted after such change is made.

3. A data processing system in accordance with claim 1 wherein said servicing means is operable, when a product feature has been installed after a base product has been installed and serviced, to service only files associated with said product feature without replacing other files previously serviced for other portions of said product.

4. A data processing system in accordance with claim 1 wherein said servicing means provides generic services, and upon completion thereof, said servicing means searches for a product specific servicing program on said CSD.

5. In a data processing system (DPS) having a processor for controlling operation of said system, a main memory for storing programs for execution by said processor which products include a multitasking operating system (OS), a graphical user interface program (GUI), a local area network (LAN) requester, and application programs, a display for presenting to a user a plurality of screens including at least some generated by said GUI, input means allowing a user to interact with said system through screens generated by said GUI program, fixed drive means for storing a plurality of installed files of different program products and a plurality of syslevel files, for such products, said program products including said OS and said GUI, and a LAN including a file server, an improved selectively operable service facility comprising:

corrective service facility means (CSF) stored in said file server, said CSF including a plurality of service files containing cumulative fixes for a plurality of said program products installed in said DPS, said CSF further comprising a selectively operable corrective service program file and a response file accessible to said LAN requester;

said LAN requestor being operable to access said response file and transfer said service program file into said memory for execution by said processor as an application program concurrently with other application programs under said multitasking operating system to provide setup means and servicing means;

said setup means being operative to automatically search through said service files from said file server and said installed files in each or said plurality of program products on said fixed drive means to find matching pairs of files with each file in each pair having an identical file name, said setup means interacting with said GUI to provide a setup screen presenting to the user a list of said matching pairs and a menu for selecting normal or backout service to be performed; and said selectively operable servicing means being responsive to user selection thereof to automatically replace each installed file of said matching pairs with said service file in each pair only when said installed file is an earlier version of a service file of the same name, so as to thereby install only selected portion of cumulative fixes where normal service is selected and to automatically replace each installed file of said matching pairs with said service file in each pair only when said installed file is a later version of a service file of the same name, so as to restore said installed files of a product to an earlier level without having to reinstall such product.

6. A data processing system in accordance with claim 5 wherein:

said setup means is operative to create lists on said setup screen of products associated with said installed files and of drives in said DPS containing installed products, said setup means being further operable to highlight default items on said lists, whereby the user can choose to service only said highlighted default items or to change which items are highlighted and service only those items which are highlighted after such change is made.

7. A data processing system in accordance with claim 5 wherein said servicing means is operable, when a product feature has been installed after a base product has been installed and serviced, to service only files associated with said product feature without replacing other files previously serviced for other portions of said product.

8. A data processing system in accordance with claim 5 wherein said servicing means provides generic services, and upon completion thereof, said servicing means searches for a product specific servicing program.

9. A data processing system in accordance with claim 5 wherein said service files are each identified by date and time stamps, and said syslevel files identify which installed files have been serviced and indicating level of service by date and time stamps identifying respective serviced installed files to thereby facilitate finding said matching pairs.

* * * * *